US012621372B2

(12) United States Patent
Nagasawa et al.

(10) Patent No.: US 12,621,372 B2
(45) Date of Patent: May 5, 2026

(54) DATA TRANSFER DEVICE AND METHOD

(71) Applicant: Hitachi Vantara, Ltd., Yokohama (JP)

(72) Inventors: Kunihiro Nagasawa, Tokyo (JP); Shoji Kato, Yokohama (JP); Ryota Tatsuuma, Yokohama (JP)

(73) Assignee: Hitachi Vantara, Ltd., Kanagawa-Ken (JP)

( * ) Notice: Subject to any disclaimer, the term of this patent is extended or adjusted under 35 U.S.C. 154(b) by 70 days.

(21) Appl. No.: 18/825,207

(22) Filed: Sep. 5, 2024

(65) Prior Publication Data

US 2025/0310424 A1 Oct. 2, 2025

(30) Foreign Application Priority Data

Mar. 27, 2024 (JP) ................................. 2024-052456

(51) Int. Cl.
*H04L 69/04* (2022.01)
(52) U.S. Cl.
CPC .................................... *H04L 69/04* (2013.01)
(58) Field of Classification Search
CPC ..... H04L 69/04; H04L 12/2856; H04L 47/10; H04L 47/2433; G06F 13/385
See application file for complete search history.

(56) References Cited

U.S. PATENT DOCUMENTS 7,403,974 B1 * 7/2008 Harris ................. G06F 12/1081
709/216
8,156,241 B1 * 4/2012 Mukherjee .............. H04L 69/04
709/236

2006/0112199 A1 * 5/2006 Sonksen ................. G06F 13/28
710/22
2008/0091857 A1 * 4/2008 McDaniel ............. H04L 63/123
710/72
2008/0101459 A1 * 5/2008 Kwon .............. H04N 21/43637
375/E7.184
2009/0185580 A1 * 7/2009 Wagh ....................... H04L 12/12
370/473
2010/0103932 A1 * 4/2010 Kako ................... H04L 12/2856
370/389
2012/0144265 A1 * 6/2012 Hwang ................. H04L 1/0082
714/E11.03
2013/0166779 A1 * 6/2013 Wakino ................. G06F 13/385
710/4

(Continued)

FOREIGN PATENT DOCUMENTS

JP 2018-132991 A 8/2018

*Primary Examiner* — Muhammad Raza
(74) *Attorney, Agent, or Firm* — Volpe Koenig

(57) ABSTRACT

Provided is a technology of conducting data transfer without 4-kB boundary crossing. A data transfer device includes a metadata creation section that creates metadata including a transfer destination address, a data transfer section that divides transfer data into a plurality of packets, imparts the metadata to a head packet, and sequentially transfers the plurality of packets, and a data transmission section that transmits the plurality of packets transferred by the data transfer section to the transfer destination address included in the metadata. The data transfer section imparts the meta-data to the head packet of the plurality of packets, and transfers the head packet according to a write address that simulates a 4-kB boundary position.

4 Claims, 7 Drawing Sheets

(56) References Cited

U.S. PATENT DOCUMENTS

| | | | |
|---|---|---|---|
| 2013/0346655 A1* | 12/2013 | Glaser | G06F 13/385 |
| | | | 710/105 |
| 2014/0086246 A1* | 3/2014 | Boucard | G06F 15/7825 |
| | | | 370/392 |
| 2014/0258567 A1* | 9/2014 | Chen | G06F 13/28 |
| | | | 710/22 |
| 2015/0309827 A1* | 10/2015 | Sarkar | G06F 9/45558 |
| | | | 718/1 |
| 2018/0232182 A1* | 8/2018 | Suzuki | G06F 3/0661 |
| 2019/0042155 A1* | 2/2019 | Ooi | G06F 13/4282 |
| 2019/0266132 A1* | 8/2019 | Rubenstein | G06F 16/182 |
| 2024/0419611 A1* | 12/2024 | Neudorf | G06F 13/1642 |

* cited by examiner

210

| | | |
|---|---|---|
| 211 212 | COMPRESSED/CLEAR DETERMINATION INFORMATION | 0 |
| 213 | COMPRESSION ID | 00000 |
| 214 | DETERMINATION PROCESSING SETTING INFORMATION | 1 |
| | SEQUENTIAL NUMBER | 00000 |

TRANSFER
START POSITION 4-kB BOUNDARY 4-kB SPACE                                    4-kB SPACE

201

201

201

CLEARTEXT 128B

205

METADATA 8B                                  202

CLEARTEXT 128B                               203

CLEARTEXT 128B                               203

8 B OF METADATA (INCLUDING 64 BITS OF TRANSFER DESTINATION ADDRESS)

205                                          201

HEAD DATA 128B          512B x 16

8,320 B OF COMPRESSION TRANSFER UNIT + (8 B OF METADATA)

| ADDRESS | TRANSFER DESTINATION |
|---|---|
| 0x0000 0000 0000 ~ | CTL0 |
| 0x1000 0000 0000 ~ | CTL1 |
| 0x2000 0000 0000 ~ | CTL2 |
| 0x3000 0000 0000 ~ | CTL3 |
| 0x4000 0000 0000 ~ | CTL4 |
| 0x5000 0000 0000 ~ | CTL5 |
| 0x6000 0000 0000 ~ | CTL6 |
| 0x7000 0000 0000 ~ | CTL7 |
| 0x8000 0000 0000 ~ | CTL8 |
| 0x9000 0000 0000 ~ | CTL9 |
| 0xA000 0000 0000 ~ | CTL10 |
| 0xB000 0000 0000 ~ | CTL11 |
| 0xC000 0000 0000 ~ | CTL12 |
| 0xD000 0000 0000 ~ | CTL13 |
| 0xE000 0000 0000 ~ | CTL14 |
| 0xF000 0000 0000 ~ | CTL15 |

FIG. 7

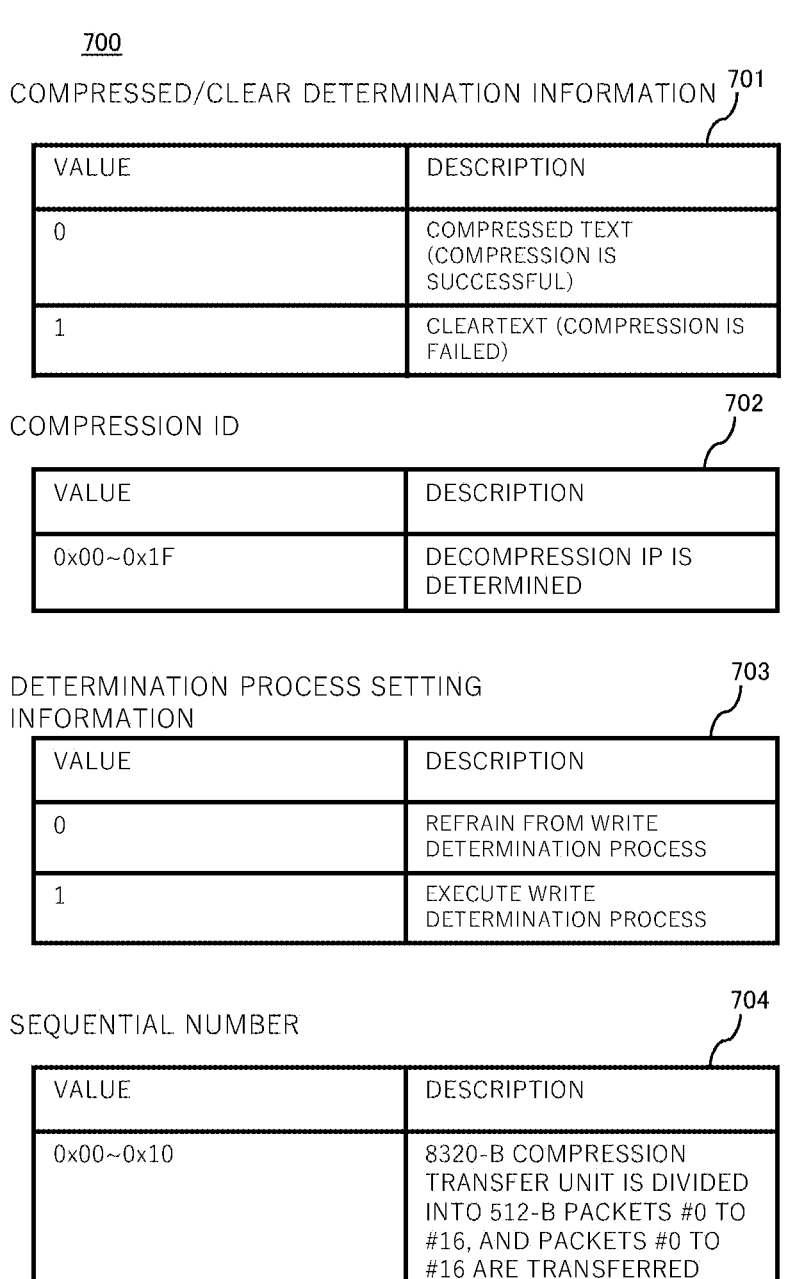

700

COMPRESSED/CLEAR DETERMINATION INFORMATION 701

| VALUE | DESCRIPTION |
|---|---|
| 0 | COMPRESSED TEXT (COMPRESSION IS SUCCESSFUL) |
| 1 | CLEARTEXT (COMPRESSION IS FAILED) |

COMPRESSION ID 702

| VALUE | DESCRIPTION |
|---|---|
| 0x00~0x1F | DECOMPRESSION IP IS DETERMINED |

DETERMINATION PROCESS SETTING INFORMATION 703

| VALUE | DESCRIPTION |
|---|---|
| 0 | REFRAIN FROM WRITE DETERMINATION PROCESS |
| 1 | EXECUTE WRITE DETERMINATION PROCESS |

SEQUENTIAL NUMBER 704

| VALUE | DESCRIPTION |
|---|---|
| 0x00~0x10 | 8320-B COMPRESSION TRANSFER UNIT IS DIVIDED INTO 512-B PACKETS #0 TO #16, AND PACKETS #0 TO #16 ARE TRANSFERRED |

DATA TRANSFER DEVICE AND METHOD

BACKGROUND OF THE INVENTION

1. Field of the Invention

The present invention relates to a data transfer device and a method.

2. Description of the Related Art

There has been known path compression transfer of, in order to increase the speed of data transfer between controllers connected to each other via a Peripheral Component Interconnect Express (PCIe) switch in a storage apparatus, transferring compressed data and decompressing the data at a transfer destination. In the path compression transfer, 8320-byte (B) data is divided into 512-B transfer packets, and the 512-B transfer packets are compressed, for example.

In path compression transfer, if a data transfer start position lies slightly before a 4-kilo byte (kB) boundary, there is a possibility that compressed transfer data crosses the 4-kB boundary. This violates the PCIe standard.

In order to obtain transfer packets divided at a 4-kB boundary in a case where data transfer is conducted in bytes, division into transfer packets must be defined for each of 1024 types of lower level addresses which are 0x0 to 0xFFC, so that complicated control is required.

A technology of preventing the size of compressed data from exceeding 4 kB is described in Japanese Patent Laid-Open No. 2018-132991 in which a division position for dividing input data into potions of a predetermined size is determined, compression positions in the input data corresponding to one position at which a size from two ends of compressed data obtained by compressing the input data is equal to or larger than the predetermined size and another position, the one position and the other position sandwiching adjacently-positioned division positions, a size between the one position and the other position being equal to or larger than the predetermined size, are determined, each preceding compression data set which is sandwiched between the compression positions that are adjacent to each other with the division position disposed therebetween is compressed, and each of following compression data sets which are obtained by dividing the input data by preceding compression data sets is compressed on the basis of the preceding compression data set adjoining the following compression data set and the following compression data sets. When the compression size is larger than 4 kB, it is determined that the compression has failed, and then, division and compression are conducted in such a way that data division is performed at the center position of the input data.

SUMMARY OF THE INVENTION

However, Japanese Patent Laid-Open No. 2018-132991 does not disclose a technology for transferring data without causing 4-kB boundary crossing in a case where a data transfer start position lies slightly before a 4-kB boundary.

Therefore, an object of the present invention is to provide a technology for transferring data without causing 4-kB boundary crossing.

In order to solve the above problems, representative one of data transfer devices according to the present invention is configured for data transfer from a transmission-side data transfer device to a reception-side data transfer device in units of a predetermined size, and includes a metadata creation section that creates metadata including a transfer destination address, a data transfer section that divides transfer data into a plurality of packets, imparts the metadata to a head packet, and sequentially transfers the plurality of packets, and a data transmission section that transmits, to the transfer destination address included in the metadata, the plurality of packets transferred by the data transfer section, in which the data transfer section transfers the head packet according to a write address that simulates a boundary position between the predetermined sizes.

According to the present invention, data transfer can be conducted without causing 4-kB boundary crossing.

Problems, configurations, and effects other than those described above will be apparent from the following detailed description.

BRIEF DESCRIPTION OF THE DRAWINGS

FIG. 6 is a diagram depicting one example of an address management table stored in a main storage memory; and FIG. 7 is a diagram depicting one example of the details of information included in the decompression control data.

DESCRIPTION OF THE PREFERRED EMBODIMENT

Hereinafter, an embodiment will be explained with reference to the drawings.

Figure 1A:
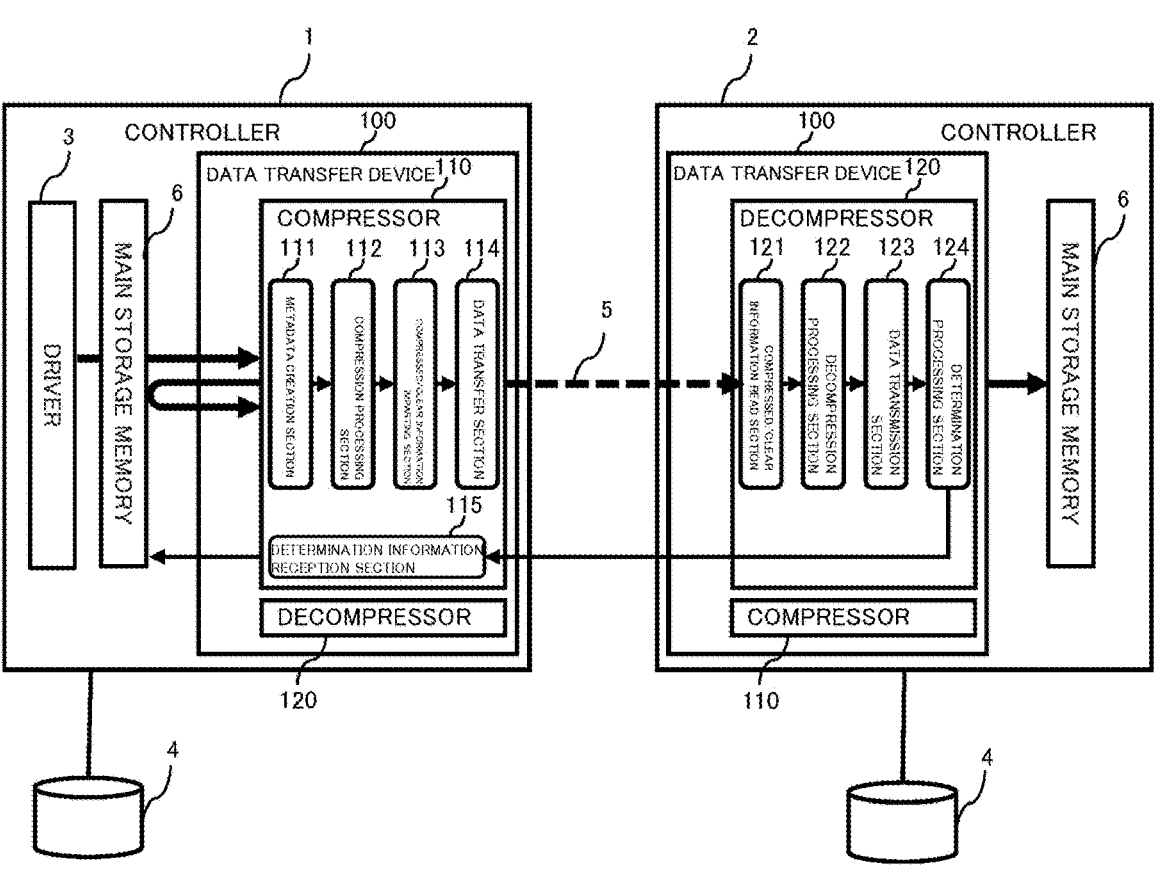
FIG. 1A is a block diagram depicting one configuration example of a data transfer device according to a present embodiment.

FIG. 1A is a block diagram depicting one configuration example of a data transfer device according to the present embodiment.

A storage apparatus includes controllers 1 and 2 that conduct data transfer and drives 4 that store data. The controller 1 and the controller 2 are connected to each other via a PCIe switch 5. The two controllers 1 and 2 are connected to the PCIe switch 5 in FIG. 1A, but three or more controllers may be connected to the PCIe switch 5.

The controller 1 or 2 transfers data in units of 4 kB to the other controller via the PCIe switch 5. Each of the controllers 1 and 2 includes a driver 3, a main storage memory 6, and a data transfer device 100 which is a field-programmable gate array (FPGA) that conducts data transfer.

It is to be noted that the present embodiment in which data transfer is conducted in units of 4 kB via the PCIe switch is not limitative, and the present invention is applicable to data transfer that is conducted in units of any other predetermined size.

The driver 3 issues a command to start up the data transfer device 100 and a command to conduct data transfer between the controllers 1 and 2. When receiving data to be transferred (transfer data) which is transmitted from an undepicted host terminal, the driver 3 designates an address (transfer destination address) in the main storage memory 6 of the transfer destination controller, adds the designated address to a transfer command parameter, stores the transfer command parameter and the transfer data into the main storage memory 6 of the controller where the driver 3 is included, and starts up the data transfer device 100. The started data transfer device 100 reads out the transfer data, the transfer destination address, and the transfer command parameter stored in the main storage memory 6, and then conducts path compression transfer.

Path compression transfer is conducted between the controllers that data is compressed in the transmission-side controller 1, is transferred via the PCIe switch 5, and is then decompressed in the reception-side controller 2. As a result of the path compression transfer, the transfer performance on the PCIe switch 5 path can be increased by approximately two times while the PCIe generation and the bus width are left unchanged.

The data transfer device 100 includes a compressor 110 that compresses transfer data and a decompressor 120 that decompresses compressed transfer data.

The compressor 110 includes a metadata creation section 111, a compression processing section 112, a compressed/clear information imparting section 113, a data transfer section 114, and a determination information transmission/reception section 115. Operations of these sections constituting the compressor 110 will be explained later with reference to FIG. 2A.

The decompressor 120 includes a compressed/clear information read section 121, a decompression processing section 122, a data transmission section 123, and a determination processing section 124. Operations of these sections constituting the decompressor 120 will be explained later with reference to FIG. 2A.

Figure 1B:
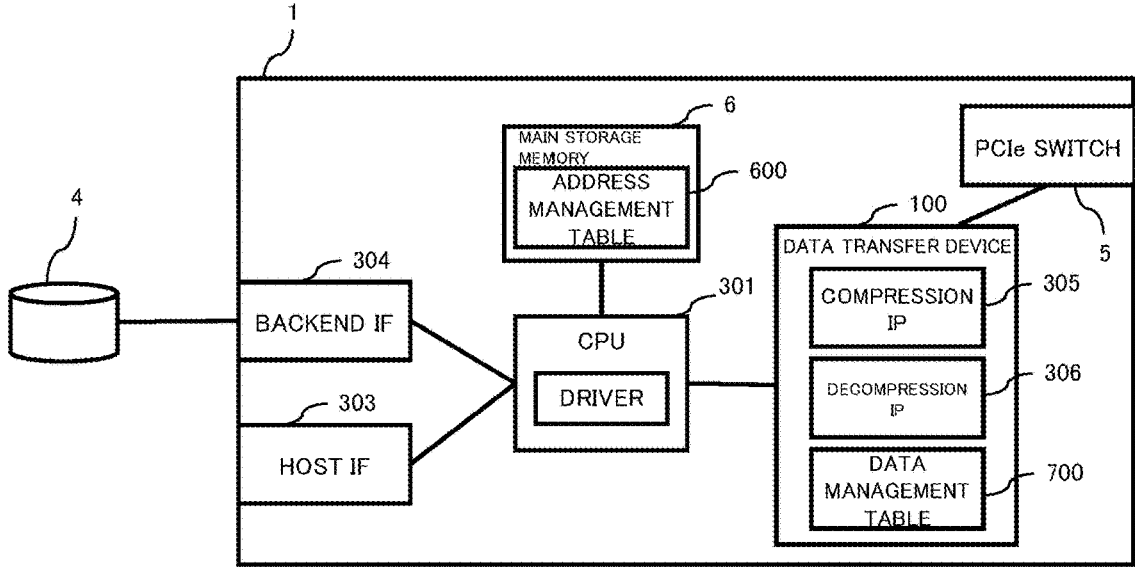
FIG. 1B is a block diagram depicting a hardware configuration of a controller including the data transfer device according to the present embodiment.

FIG. 1B is a block diagram depicting a hardware configuration of the controller 1 including the data transfer device 100 according to the present embodiment.

The controller 1 includes a central processing unit (CPU) 301 that implements necessary functions by executing a program stored in the main storage memory 6, the main storage memory 6 that stores, in addition to programs and data which are for use in path compression transfer, an address management table 600 which will be explained later with reference to FIG. 6, a host interface 303 that controls communication with an undepicted host terminal, a backend interface 304 that controls communication with the drive 4, and the data transfer device 100. The CPU 301 implements the function of the driver 3 in FIG. 1A by reading out a program stored in the main storage memory 6.

The data transfer device 100 includes a plurality of compression intellectual properties (IPs) 305 for compressing data, and a plurality of decompression IPs 306 for decompressing data. In addition, the data transfer device 100 stores, as part of a circuit, a data management table 700 which will be explained later with reference to FIG. 7.

It is to be noted that the compression IPs 305 in the data transfer device 100 correspond to the compression sections 111 to 114 of the compressor 110 in FIG. 1A, and the decompression IPs 306 correspond to the decompression sections 121 to 124 of the decompressor 120 in FIG. 1A.

Figures 2A, 2B:
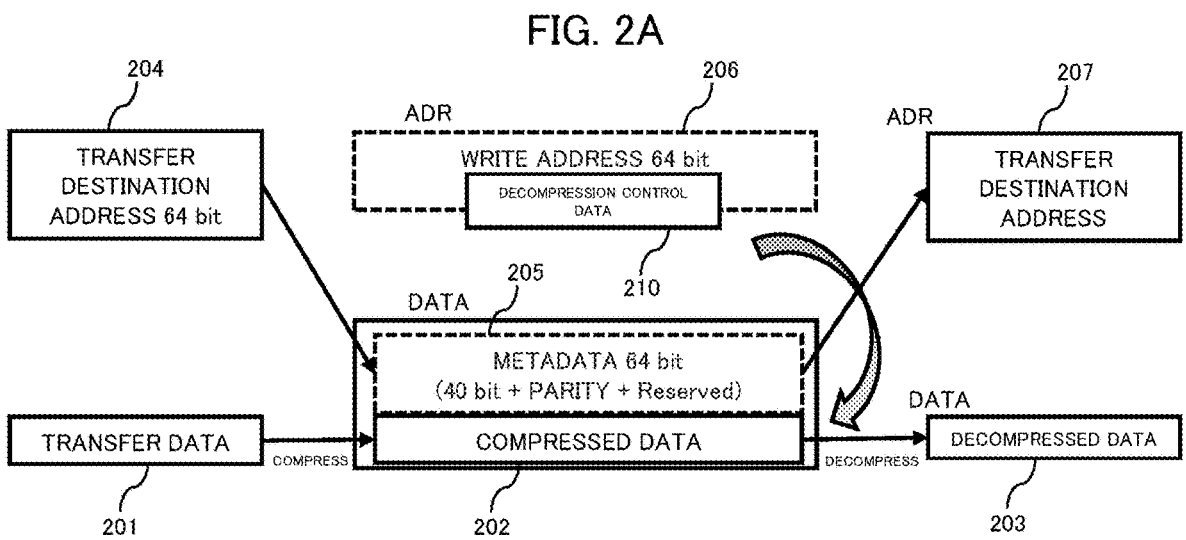
FIG. 2A is a diagram depicting one configuration example of data that is transferred by the data transfer device according to the present embodiment.
FIG. 2B is a diagram depicting one configuration example of decompression control data.

FIG. 2A is a diagram depicting one configuration example of data that is transferred by the data transfer device 100 according to the present embodiment.

As previously explained, the driver 3 provides transfer data 201 and a transfer destination address 204 included in a transfer command parameter to the data transfer device 100. The transfer destination address 204 indicates a storage destination address for the transfer data 201 in the main storage memory 6 in the transfer destination controller, and is expressed by data having a 64-bit length, for example.

In path compression transfer, the compressor 110 of the data transfer device 100 of the transmission-side controller 1 divides the transfer data 201 into a plurality of packets, compresses the packets to create compressed data 202, and transfers the compressed data 202 to the reception-side controller 2. The decompressor 120 of the data transfer device 100 of the reception-side controller 2 decompresses the compressed data 202 to obtain decompressed data 203.

In the compressor 110 of the data transfer device 100 of the transmission-side controller 1, the metadata creation section 111 creates metadata 205, which is depicted in FIG. 2A, by referring to the transfer destination address 204. For example, the transfer destination address 204 may be directly used as the metadata 205, or the metadata 205 may indicate an attribute, a characteristic, or the like of the transfer data 201 to identify the transfer data 201.

In addition, the compression processing section 112 divides the transfer data 201 into a plurality of packets, and creates the compressed data 202 by compressing the packets at the compression IP 305 depicted in FIG. 1B.

In addition, the compressed/clear information imparting section 113 determines whether or not the compression processing section 112 has successfully compressed the packets, and saves the determination result in decompression control data 210. The details of the decompression control data 210 will be explained later with reference to FIG. 2B.

Further, for each of the packets of the compressed data 202 created by the compression processing section 112, the data transfer section 114 identifies the reception-side controller 2 as a data transfer destination by referring to the address management table 600 depicted in FIG. 6, and transfers the packets thereto.

As previously explained, the driver 3 of the transmission-side controller 1 designates a transfer destination address in the main storage memory 6 of the transfer destination controller, but the address value to be designated is determined as desired. Therefore, in a case where the address of the head data of the transfer data 201 lies before a 4-kB boundary, 4-kB boundary crossing occurs if the transfer data in this state is transferred. This violates the PCIe standard.

To avoid this violation, the data transfer section 114 creates a write address 206 for setting a transfer start position of the head data at a 4-kB boundary. The write address 206 is an address having a 64-bit length for sending data in accordance with the PCIe standard, and is transferred along with each of the divided packets.

For example, the byte length of transfer data is designated by a bit value of the write address 206, and the lower 9 bits of the write address 206 are set to 0. Accordingly, the transfer start position of the head data is set to be an integral multiple of 512 B, so that the compressed data 202 can be transferred without crossing a 4-kB boundary. To create the write address 206, a part of the transfer destination address 204 (e.g., upper bit values of the transfer destination address 204) may be directly used.

The decompression control data 210 for use in decompression of the compressed data 202 at the reception-side controller 2 is included in the write address 206.

In the decompressor 120 of the data transfer device 100 of the reception-side controller 2, the compressed/clear information read section 121 reads out the decompression control data 210 included in the write address 206, by referring to the data management table 700 depicted in FIG. 7.

In addition, the decompression processing section 122 creates the decompressed data 203 by causing the decompression IP 306 in FIG. 1B to decompress the compressed data 202 transmitted from the controller 1.

In addition, the data transmission section 123 restores a transfer destination address 207 from the metadata 205 imparted to the compressed data 202 transmitted from the controller 1, and transmits the decompressed data 203 to the transfer destination address 207.

Further, the determination processing section 124 reads out the last 8 B of the decompressed data 203 from a transfer destination address in the main storage memory 6, compares the read data with the transfer data 201, and determines whether or not the compressed data 202 has been correctly decompressed by the decompression processing section 122 and been transferred to the transfer destination address. When the last 8 B of the decompressed data 203 matches the last 8 B of the transfer data 201, the determination processing section 124 determines that the compressed data 202 has been correctly decompressed by the decompression processing section 122 and been transferred. When the last 8 B of the decompressed data 203 does not match the last 8 B of the transfer data 201, the determination processing section 124 determines that the compressed data 202 has been not correctly decompressed by decompression processing section 122 or been not correctly transferred. The determination processing section 124 transmits determination information indicating the result of the determination process to the determination information transmission/reception section 115 of the transmission-side controller 1.

The determination information transmission/reception section 115 of the transmission-side controller 1 receives the determination information transmitted from the determination processing section 124, stores the determination process result into the main storage memory 6, and issues a report to the driver 3.

FIG. 2B is a diagram depicting one configuration example of the decompression control data 210.

The decompression control data 210 includes compressed/clear determination information 211, a compression ID 212, determination processing setting information 213, and a sequential number 214.

The compressed/clear determination information 211 indicates whether or not the transfer data 201 has been successfully compressed by the compression processing section 112.

The compression ID 212 represents the number of the compression IP 305 that has compressed the transfer data 201.

The determination processing setting information 213 is setting information indicating whether or not the determination processing section 124 of the decompressor 120 of the reception-side controller 2 executes a determination process of determining whether or not the compressed data 202 is correctly decompressed and written into the main storage memory 6.

The sequential number 214 is a serial number assigned to the compressed data 202 by the compressed/clear information imparting section 113. Pieces of the compressed data 202 are separated by 512 B from each other, which will be explained later with reference to FIG. 3B. The write address 206 for the corresponding piece of the compressed data 202 can be designated on the basis of the sequential number 214.

FIG. 6 is a diagram depicting one example of an address management table stored in the main storage memory 6.

Information about a transfer destination controller corresponding to an address (e.g., the transfer destination address 204) included in the metadata 205 is stored in the address management table 600. Information about a transfer destination controller and an address pattern of the corresponding specific bits in the transfer destination address 204 are stored in association in the address management table 600. A transfer destination controller of the transfer data 201 can be identified with reference to the address pattern. In this case, if the above address pattern of the transfer destination address 204 is adopted in the write address 206, the transfer destination controller can be identified with reference to the write address 206.

FIG. 7 is a diagram depicting one example of the details of information constituting decompression control data. The detailed information in FIG. 7 is stored in the data management table 700, and is used to create decompression control data and read out the decompression control data 210 included in the write address 206 during a path compression transfer process.

The data management table 700 includes a compressed/clear determination information management table 701, a compression ID management table 702, a determination processing setting information management table 703, and a sequential number management table 704.

Information indicating whether or not the compression processing section 112 has successfully compressed the transfer data 201 is stored in the compressed/clear determination information management table 701. According to the compressed/clear determination information management table 701, a value "0" which indicates a compressed text, if the compression has been successfully done, or a value "1" which indicates a cleartext, if the compression has failed, is stored into the compressed/clear determination information 211.

In the compression ID management table 702, the number of the decompression IP 306 to decompress the compressed data is stored in association with the compression IP 305 that has compressed the transfer data 201. Then, during a series of data transfer, path compression transfer is conducted using a combination of the compression IP 305 and the decompression IP 306 stored in the compression ID management table 702.

In the determination processing setting information management table 703, setting information indicating whether or not to execute a determination process of determining, by the determination processing section 124, whether or not the compressed data 202 has been correctly decompressed is stored. According to the determination processing setting information management table 703, a value "0" which indicates that setting for refraining the determination process is performed or a value "1" which indicates that setting for executing the determination process is performed is stored into the determination processing setting information 213.

In the sequential number management table 704, sequential numbers which are serial numbers assigned to packets of the compressed data 202 are stored.

Figure 3A:
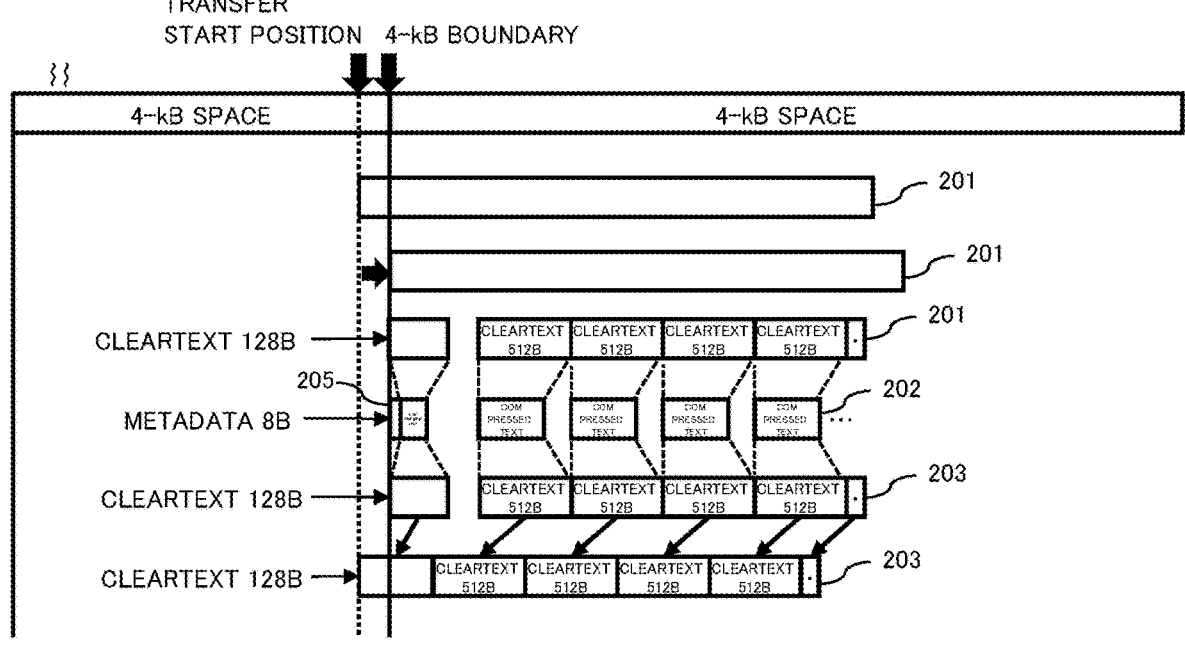
FIG. 3A is an explanatory diagram of path compression transfer that is performed by the data transfer device according to the present embodiment.

FIG. 3A is an explanatory diagram of path compression transfer that is performed by the data transfer device 100 according to the present embodiment.

As depicted in FIG. 3A, in a case where a transfer start position of the transfer data 201 from the transmission-side controller 1 to the reception-side controller 2 lies slightly before a 4-kB boundary, the transfer data 201 crosses the 4-kB boundary. This violates the PCIe standard.

In view of this, transfer is conducted with the write address 206 designated at the position of the 4-kB boundary. Specifically, the compression processing section 112 compresses the transfer data 201 to create the compressed data 202, the data transfer section 114 uses, for lower bits of the write address 206, fixed values to achieve 4 kB alignment (for example, sets the lower 9 bits of the write address 206 to 0), and transfers the compressed data 202 to the controller 2. The original transfer destination address 204 is imparted as the metadata 205 to the head data of the compressed data 202.

In the reception-side controller 2, the compressed data 202 is decompressed to create decompressed data 203, and the correct transfer destination address 207 is restored with reference to the metadata 205.

Accordingly, the compressed data 202 can be transferred to the controller 2 without crossing the 4-kB boundary.

Figure 3B:
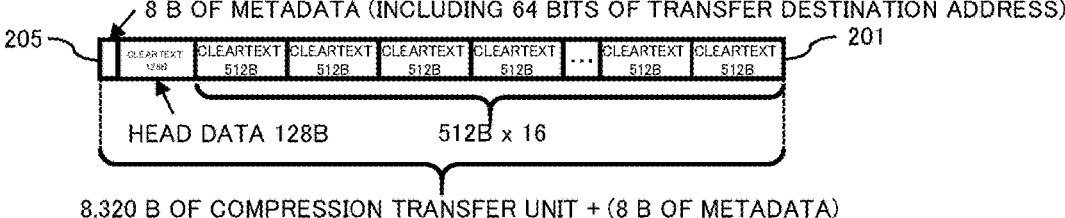
FIG. 3B is an explanatory diagram of units in transfer data compression transfer that is performed by the data transfer device according to the present embodiment.

FIG. 3B is an explanatory diagram of units in transfer data compression transfer that is performed by the data transfer device 100 according to the present embodiment.

The transfer data 201 is compressed and transferred in compression transfer units of 8320 B+ (8 B of metadata).

The head data of a compression transfer unit is a 128-B cleartext packet, and the following data is divided into 16 cleartext packets of 512 B. The divided packets are individually compressed. Further, 8-B metadata is added to the head data.

Figure 4:
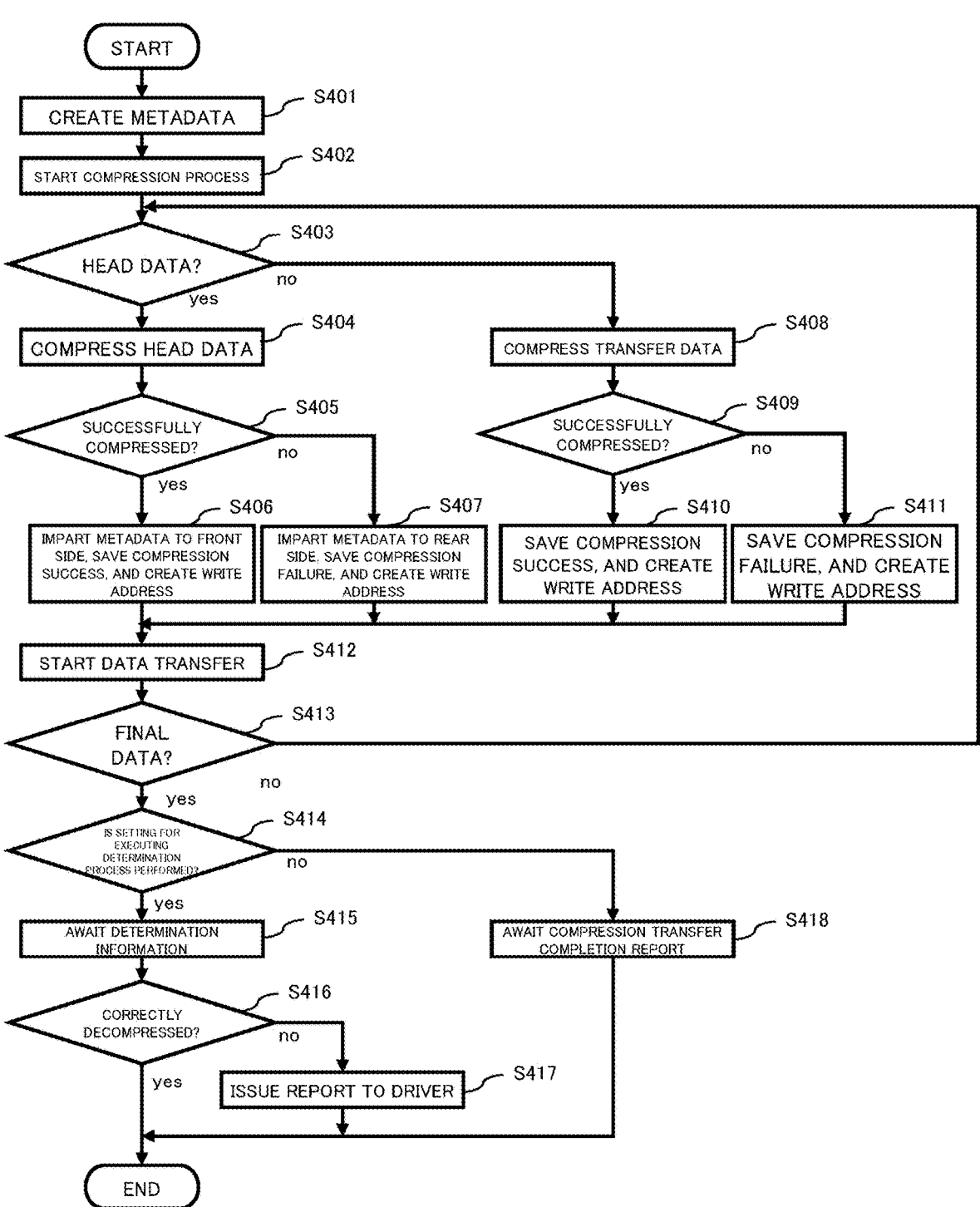
FIG. 4 is a flowchart of one example of a path compression transfer process that is performed by the data transfer device according to the present embodiment.

FIG. 4 is a flowchart of one example of a path compression transfer process that is performed by the data transfer device according to the present embodiment. This process is performed by the data transfer device 100 of the transmission-side controller 1. It is to be noted that path compression transfer in the present embodiment will be explained on the assumption that the controller 1 receives, from an undepicted host terminal, data (transfer data) to be written into the drive 4 being managed in the controller 2, and compresses and transfers the data.

The data transfer device 100 reads out transfer data and a transfer destination address from the main storage memory 6, and determines that the transfer destination is the main storage memory 6 of the controller 2. Then, the metadata creation section 111 creates the metadata 205 by referring to the transfer destination address 204 (step S401).

Next, the compression processing section 112 starts compressing the transfer data 201 (step S402). As depicted in FIG. 3B, the head data of the transfer data 201 is a 128-B cleartext, and the following data of the transfer data 201 is divided into 16 cleartext packets of 512 B. The divided packets are individually compressed to create the compressed data 202.

At step S403, whether or not a packet to be compressed is the head data of a compression transfer unit.

When the packet to be compressed is the head data at step S403 (Yes at step S403), the compression processing section 112 compresses the packet (step S404), and the compressed/clear information imparting section 113 determines whether or not the packet has been successfully compressed (step S405).

When it is determined at step S405 that the packet has been successfully compressed (Yes at step S405), the metadata 205 created at step S401 is imparted to the front side of the head data packet, the compressed/clear information imparting section 113 saves a value "0" which indicates that the compression has been successfully done, into the compressed/clear determination information 211 in the decompression control data 210, and the data transfer section 114 creates the write address 206 for setting a transfer start position at a 4-kB boundary (step S406). Then, the process proceeds to step S412.

When it is determined at step S405 that the packet compression has failed (No at step S405), the metadata 205 created at step S401 is imparted to the rear side of the cleartext head data packet, the compressed/clear information imparting section 113 saves a value "1" which indicates that the compression has failed, into the compressed/clear determination information 211 in the decompression control data 210, and the data transfer section 114 creates the write address 206 for setting the transfer start position at a 4-kB boundary (step S407). Then, the process proceeds to step S412.

When the packet to be compressed is not the head data at step S403 (No at step S403), the compression processing section 112 compresses the packet (step S408), and the compressed/clear information imparting section 113 determines whether or not the packet has been successfully compressed (step S409).

When it is determined at step S409 that the packet has been successfully compressed (Yes at step S409), the compressed/clear information imparting section 113 saves a value "0" which indicates that the compression has been successfully done, into the compressed/clear determination information 211 in the decompression control data 210, the data transfer section 114 creates the write address 206 on the basis of the write address 206 for the head data and the sequential number 214 of the packet (step S410). Then, the process proceeds to step S412.

When it is determined at step S409 that the packet compression has failed (No at step S409), the compressed/clear information imparting section 113 saves a value "1" which indicates that the packet compression has failed, into the compressed/clear determination information 211 in the decompression control data 210, and the data transfer section 114 creates the write address 206 on the basis of the write address 206 for the head data and the sequential number 214 of the packet (step S411). Then, the process proceeds to step S412.

At step S412, the data transfer section 114 starts transferring the compressed data 202 to the reception-side controller 2. The cleartext packet compression of which has failed at step S404 or step S408 is transferred as it is to the controller 2. The compressed data 202 to be transferred at this step includes a compressed text packet that has been successfully compressed at step S404 or step S408 and a cleartext packet compression of which has failed at step S404 or step S408.

Next, the data transfer device 100 determines whether or not the transferred packet is final data of the compression transfer unit (step S413). Determination on whether or not the transferred packet is final data is made by comparison of a numerical value obtained by dividing the size of the transfer data by the size of the transferred packet with the sequential number, for example.

When it is determined at step S413 that the transferred packet is not the final data of the compression transfer unit (No at step S413), the process returns to step S403 to continue compressing packets by the compression processing section 112. Meanwhile, when it is determined at step S413 that the transferred packet is the final data of the compression transfer unit (Yes at step S413), the process proceeds to step S414.

At step S414, the data transfer device 100 determines whether or not setting for executing the determination process at the reception-side controller 2 is performed, by referring to the determination processing information 213 setting in the decompression control data 210. Whether or not to perform setting for executing the determination process may be determined by setting the determination processing setting information 213 in accordance with a command transmitted from an undepicted host terminal to the transmission-side controller 1, for example.

When setting for executing the determination process at the reception-side controller 2 is performed at step S414 (Yes at step S414), determination information from the decompressor 120 of the reception-side controller 2 is awaited (step S415).

Next, the determination information transmission/reception section 115 confirms the determination information from the decompressor 120 of the reception-side controller 2, and determines whether or not the compressed data 202 has been correctly decompressed and has been determined to be written to the transfer destination address in the main storage memory 6 (step S416).

When it is determined at step S416 that the compressed data 202 has been correctly decompressed and has been determined to be written to the transfer destination address in the main storage memory 6 (Yes at step S416), the present process is exited. It is to be noted that the determination information transmission/reception section 115 may issue, to the driver 3, a report indicating that the path compression transfer has been successfully conducted.

Meanwhile, when it is determined at step S416 that the compressed data 202 has not been correctly decompressed or has not been determined to be written to the transfer destination address in the main storage memory 6 (No at step S416), the determination information transmission/reception section 115 issues, to the driver 3, a report indicating that the path compression transfer has failed (step S417). Then, the present process is exited. Accordingly, the driver 3 can present the path compression transfer failure to a user, so that the user can address the failure by sending a data transfer command again, for example.

When setting for executing the determination process at the reception-side controller 2 is not performed at step S414 (No at step S414), a compression transfer completion report from the decompressor 120 of the controller 2 is awaited (step S418). Then, the present process is exited.

Figure 5:
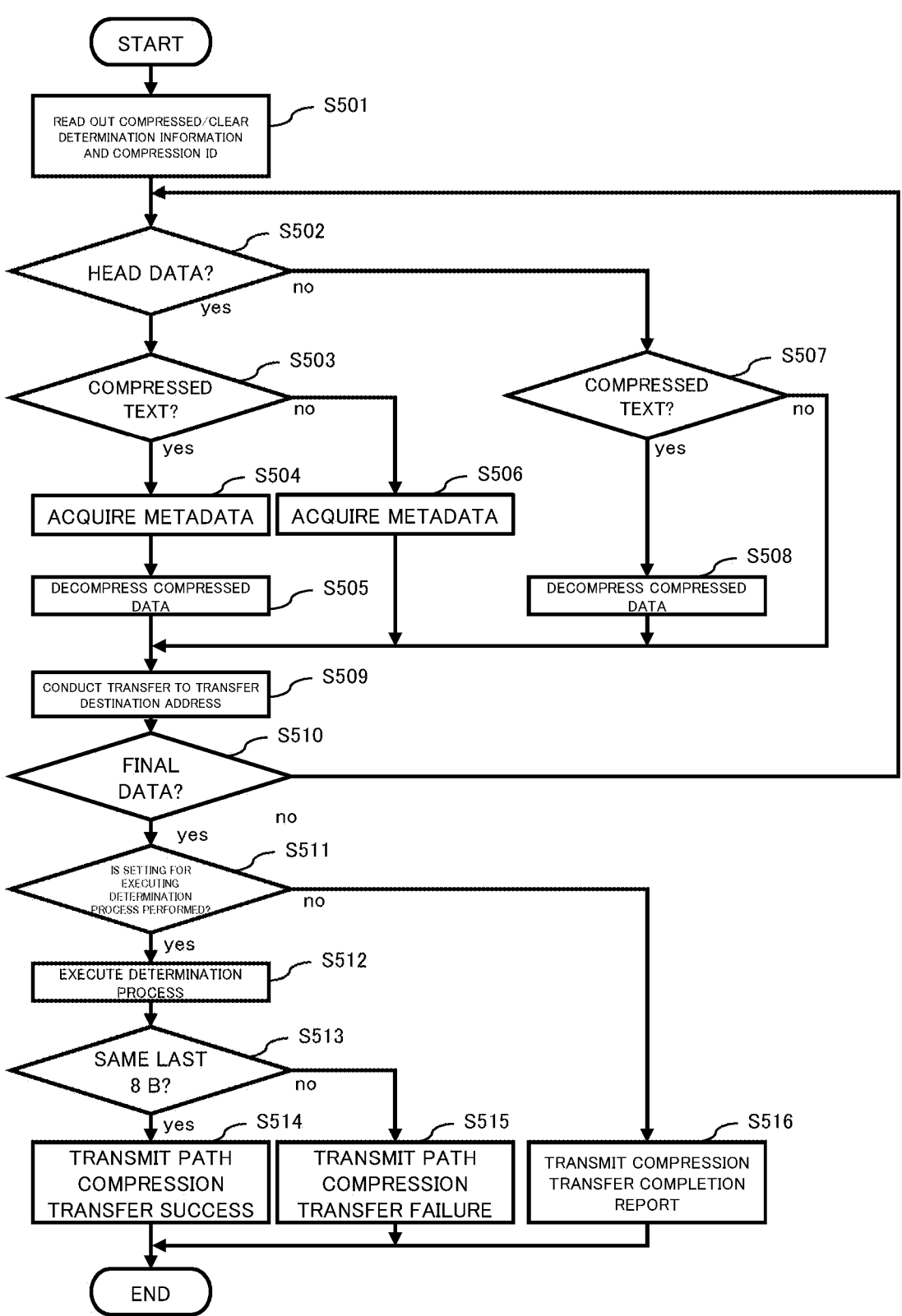
FIG. 5 is a flowchart of one example of a decompression process that is performed by the data transfer device according to the present embodiment.

FIG. 5 is a flowchart of one example of a decompression process that is performed by the data transfer device according to the present embodiment. This process is performed by the data transfer device 100 of the reception-side controller 2.

When receiving the compressed data 202 from the transmission-side controller 1, the compressed/clear information read section 121 reads out the compressed/clear determination information 211 and the compression ID 212 from the decompression control data 210 in the write address 206 (step S501).

Next, whether or not the received packet is the head data of the compression transfer unit (step S502).

When it is determined at step S502 that the received packet is the head data (Yes at step S502), the compressed/clear information read section 121 determines whether or not the received head data packet is a compressed text, by referring to the compressed/clear determination information 211 read out at step S501 (step S503). Here, according to the compressed/clear determination information management table 701 in FIG. 7, the packet is determined to be a compressed text if the value of the compressed/clear determination information 211 is "0," and the packet is determined to be a cleartext if the value of the compressed/clear determination information 211 is "1."

When it is determined at step S503 that the received head data packet is a compressed text (Yes at step S503), the decompression processing section 122 acquires the metadata 205 imparted to the received head data packet (step S504).

Next, the compression IP 305 in the controller 1 having performed the compression is identified from the compression ID 212 read out at step S501, the decompression IP 306 in the controller 2 to perform decompression is decided, and then, the decompression processing section 122 decompresses the head data packet (step S505). Then, the process proceeds to step S509. At step S505, the decompression processing section 122 stores a combination of the compression IP 305 having performed the compression and the decided decompression IP 306 into the compression ID management table 702 in the controller 2.

When it is determined at step S503 that the received head data packet is a cleartext (No at step S503), the decompression processing section 122 acquires the metadata 205 imparted to the received head data packet (step S506). Then, the process proceeds to step S509.

When it is determined at step S502 that the received packet is not the head data (No at step S502), the compressed/clear information read section 121 determines whether or not the received packet is a compressed text, by referring to the compressed/clear determination information 211 read out at step S501 (step S507).

When it is determined at step S507 that the received packet is a compressed text (Yes at step S507), the decompression processing section 122 identifies the decompression IP 306 having decompressed the head data stored in association with the compression IP 305 which corresponds to the compression ID 212 read out at step S501, by referring to the compression ID management table 702. Subsequently, the decompression processing section 122 decompresses the packet by using the identified decompression IP 306 (step S508), and then, the process proceeds to step S509.

When it is determined at step S507 that the received packet is a cleartext (No at step S507), the process proceeds to step S509.

At step S509, the data transmission section 123 transfers the decompressed data 203 to the transfer destination address 207 restored from the metadata 205 imparted to the packet. It is assumed that the decompressed data 203 to be transferred at this step includes a cleartext packet decompressed from the compressed text at step S505 or step S508 and a packet determined to be a cleartext at step S503 or step S507. To transfer the decompressed data 203 to the transfer destination address 207, the data transmission section 123 stores the decompressed data 203 into the transfer destination address 207 in the main storage memory 6 of the controller 2, and the controller 2 writes the decompressed data 203 into the drive 4 via the backend interface 304 in asynchronization with the storage into the main storage memory 6.

Next, whether or not the packet transferred at step S509 is final data of the compression transfer unit is determined (step S510). For the determination on the final data, the compressor 110 of the controller 1 may set a flag bit in the write address 206 to be imparted to a packet corresponding to the final data and transfer the packet such that the decompressor 120 of the controller 2 can make the determination on the basis of the value of the flag bit.

When it is determined at step S510 that the transferred packet is not the final data of the compression transfer unit (No at step S510), the process returns to step S502 to continue decompressing packets by the decompression processing section 122. Meanwhile, when it is determined at step S510 that the transferred packet is the final data of the compression transfer unit, the process proceeds to step S511.

At step S511, whether or not setting for executing the determination process at the reception-side controller 2 is performed is determined with reference to the determination processing setting information 213 in the decompression control data 210.

When setting for executing the determination process at the reception-side controller 2 is performed at step S511, the determination processing section 124 executes the determination process of determining whether the final data has been correctly decompressed and been transferred to the transfer destination address (step S512).

Specifically, in the determination process, the determination processing section 124 reads out the values in the last 8 B of the final data from the transfer destination address in the main storage memory 6, and determines whether or not the read values match the values in the last 8 B of the transfer data 201 (step S513). To make the determination on matching between the final data and the corresponding transfer data, reference to a data protection code (e.g., Data Integrity Field (DIF)) created from these data may be made. Reference to the data protection code may be made not only for the final data but also for the whole transfer data such that integrity of the decompressed data can be ensured.

In addition, to refer to the transfer data 201, the determination processing section 124 may issue, to the controller 1, a re-transfer command for the transfer data to be compared, and the controller 1 having received the command may transfer the transfer data in a cleartext state.

When the values in the last 8 B of the final data match the values in the last 8 B of the transfer data 201 at step S513 (Yes at step S513), it is determined that the compressed data 202 has been correctly decompressed by the decompression processing section 122 and been transferred, and determination information indicating that the path compression transfer has been successfully conducted is transmitted to the data transfer device 100 of the transmission-side controller 1 (step S514). Then, the present process is exited.

When the values in the last 8 B of the final data do not match the values in the last 8 B of the transfer data 201 at step S513, it is determined that the compressed data 202 has not been correctly decompressed by the decompression processing section 122 or has not been correctly transferred, and determination information indicating that the path compression transfer has failed is transmitted to the data transfer device 100 of the transmission-side controller 1 (step S515). Then, the present process is exited.

When setting for executing the determination process at the reception-side controller 2 is not performed at step S511, a compression transfer completion report indicating that the path compression transfer is completed is transmitted to the data transfer device 100 of the transmission-side controller 1 (step S516). Then, the present process is exited.

According to the present embodiment, the data transfer device 100 of the transmission-side controller 1 transfers data according to the write address 206 for setting a transfer start position at a 4-kB boundary, while the data transfer device 100 of the reception-side controller 2 transfers transfer data to a transfer destination address restored from the metadata 205 imparted to the transfer data. Accordingly, data can be transferred without crossing a 4-kB boundary.

In addition, the determination processing section 124 executes the determination process of determining whether the compressed data 202 has been correctly decompressed by the decompression processing section 122 and been transferred to the transfer destination address. Accordingly, whether or not path compression transfer has been successfully done can be presented to a user.

Further, since the decompression control data 210 including the compressed/clear determination information 211, the compression ID the determination 212, processing setting information 213, and the sequential number 214 is transferred together with a packet, the data transfer device 100 of the reception-side controller 2 can decompress the data and execute the determination process by referring to the decompression control data 210.

It is to be noted that the present invention is not limited to the above-mentioned embodiment, and a variety of modifications thereof are included in the present invention. For example, since the above-mentioned embodiment is a detailed illustration of the present invention for easy understanding, the present invention is not necessarily limited to an embodiment including all the components having been explained above. In addition, part of a configuration of a certain embodiment can be replaced with a configuration of another embodiment, and a configuration of a certain embodiment can be added to a configuration of another embodiment. Further, in each of the embodiments, addition, deletion, or replacement of a certain configuration can be made for another configuration.

In addition, the above-mentioned configurations, functions, processors, processing means, etc., may be implemented by hardware by being partially or wholly designed on an integrated circuit, for example. Moreover, the above-mentioned configuration, functions, etc., may be implemented by software by a processor interpreting and executing programs for implementing the respective functions. Information on programs, tables, files, and the like for implementing the functions can be put in a recording device such as a memory, a hard disk, or a solid state drive (SSD) or in a recording medium such as an integrated circuit (IC) card, an SD card, or a digital versatile disc (DVD).

What is claimed is:

1. A data transfer device for data transfer from a transmission-side data transfer device to a reception-side data transfer device in units of a predetermined size, the data transfer device comprising:

a metadata creation section executed on a hardware processor that creates metadata including a transfer destination address;

a data transfer section executed on the hardware processor that divides transfer data into a plurality of packets, imparts the metadata to a head packet, and sequentially transfers the plurality of packets; and a data transmission section executed on the hardware processor that transmits, to the transfer destination address included in the metadata, the plurality of packets transferred by the data transfer section,
wherein
the data transfer section transfers the head packet according to a write address that simulates a boundary position between the predetermined sizes,
further comprising:

a compression processing section executed on the hardware processor that compresses the packets, a decompression processing section executed on the hardware processor that decompresses the packets compressed by the compression processing section, a determination processing section executed on the hardware processor that executes a determination process of comparing the packets decompressed by the decompression processing section with the transfer data and determining whether the packets have been correctly decompressed by the decompression processing section and been transferred to the transfer destination address, wherein the determination processing section transmits determination information which indicates a result of the determination process to the transmission-side data transfer device, wherein the data transfer section transfers, together with the packets, determination processing setting information which indicates whether or not to execute the determination process, and the determination processing section determines whether or not to execute the determination process, by referring to the determination processing setting information.

2. The data transfer device according to claim 1, wherein the data transfer section transfers, together with each of the plurality of packets, compressed/clear determination information which indicates whether or not the packet is compressed data, and the decompression processing section determines whether or not to decompress the packet, by referring to the compressed/clear determination information.

3. The data transfer device according to claim 1, wherein, if the head packet has been successfully compressed by the compression processing section, the data transfer section imparts the metadata to a front side of the head packet, and, if compression of the head packet has failed by the compression processing section, the data transfer section imparts the metadata to a rear side of the head packet.

4. A data transfer method for data transfer from a transmission-side data transfer device to a reception-side data transfer device in units of a predetermined size, the data transfer method comprising:

a metadata creation step of creating metadata including a transfer destination address;

a data transfer step of dividing transfer data into a plurality of packets, imparting the metadata to a head packet, and sequentially transferring the plurality of packets; and a data transmission step of transmitting the plurality of packets transferred at the data transfer step to the transfer destination address included in the metadata, wherein, in the data transfer step, the metadata is imparted to the head packet of the plurality of packets, and the head packet is transferred according to a write address that simulates a boundary position between the predetermined sizes, further comprising:

a compression processing section that compresses the packets, a decompression processing section that decompresses the packets compressed by the compression processing section, a determination processing section that executes a determination process of comparing the packets decompressed by the decompression processing section with the transfer data and determining whether the packets have been correctly decompressed by the decompression processing section and been transferred to the transfer destination address, wherein the determination processing section transmits determination information which indicates a result of the determination process to the transmission-side data transfer device, wherein the data transfer section transfers, together with the packets, determination processing setting information which indicates whether or not to execute the determination process, and the determination processing section determines whether or not to execute the determination process, by referring to the determination processing setting information.

* * * * *